(12) United States Patent
Sanghera et al.

(10) Patent No.: US 7,982,983 B2
(45) Date of Patent: Jul. 19, 2011

(54) ULTRA BROAD BAND BEAM STEERING APPARATUS AND METHOD USING CHALCOGENIDE-BASED RISLEY COMBINATION-PRISM PAIR

(75) Inventors: Jasbinder S. Sanghera, Ashburn, VA (US); Catalin M Florea, Washington, DC (US); Ishwar D. Aggarwal, Fairfax Station, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 206 days.

(21) Appl. No.: 12/430,162

(22) Filed: Apr. 27, 2009

(65) Prior Publication Data
US 2010/0271719 A1    Oct. 28, 2010

(51) Int. Cl.
G02B 5/04    (2006.01)
(52) U.S. Cl. ........................................................ 359/834
(58) Field of Classification Search ........... 359/831–837
See application file for complete search history.

(56) References Cited

U.S. PATENT DOCUMENTS

| | | | |
|---|---|---|---|
| 5,579,177 A * | 11/1996 | Stumpf | 359/837 |
| 6,343,767 B1 | 2/2002 | Sparrold et al. | |
| 6,344,937 B1 | 2/2002 | Sparrold et al. | |
| 6,747,738 B2 | 6/2004 | Knapp | |
| 6,928,227 B2 | 8/2005 | Shaw et al. | |
| 6,935,757 B1 | 8/2005 | Mooney et al. | |
| 7,037,005 B2 | 5/2006 | Kreger et al. | |
| 7,236,299 B1 | 6/2007 | Smith | |
| 7,283,712 B2 | 10/2007 | Shaw et al. | |
| 7,327,928 B2 | 2/2008 | Shaw et al. | |

OTHER PUBLICATIONS

Weber et al., "Diffractively Corrected Risley Prism for Infrared Imaging," Acquisition, Tracking, and Pointing XIV, Michael K. Masten, Larry A. Stockum, Editors, Proceedings of SPIE vol. 4025 (2000), pp. 79-86.
Ricard et al., "Flight Testing the Infrared Eye Prototype," Thermosense XXIV, Xavier P. Maldague, Andres E. Rozolosnik, Editors, Proceedings of SPIE vol. 4710 (2002), pp. 241-252.
Lacoursiere et al., "Large-deviation achromatic Risley prisms pointing systems," Optical Scanning 2002, Stephen F. Saga, Gerald F. Marshall, Leo Beiser, Editors, Proceedings of SPIE vol. 4773 (2002), pp. 123-131.
Duncan et al., "Wide-angle achromatic prism beam steering for infrared countermeasure applications," Opt. Eng. 42(4), 1038-1047 (Apr. 2003).
Matsui et al., "Free-Space Optical Switch Modules Using Risley Optical Beam Deflectors," Japanese Journal of Applied Physics, 45, 3A, 1658-1660 (2006).
Schwarze, "A New Look at Risley Prisms," Photonics Spectra (Jun. 2006).
Schwarze et al., "Risley-Prism Based Compact Laser Beam Steering for IRCM, Laser Communications, and Laser Radar," OPTRA Inc., Topsfield, MA.

(Continued)

*Primary Examiner* — Euncha P Cherry
(74) *Attorney, Agent, or Firm* — Amy L. Ressing; Rebecca L. Forman

(57) ABSTRACT

Beam steering apparatus is presented having a Risley double-prism pair with first and second double-prisms disposed along an optical path, where one or more of the prisms are made from a chalcogenide glass material.

20 Claims, 6 Drawing Sheets

OTHER PUBLICATIONS

Honey et al., "Steered Agile Beams (STAB)," Commerce Business Daily, PSA #2342, May 10, 1999.

Marshall, "Risley Prism Scan Patterns," Part of the SPIE Conference on Optical Scanning: Design and Application, Denver, Colorado, Jul. 1999, SPIE vol. 3787, pp. 74-86.

Curatu et al., "Rotating prisms scanning system to equip a NFOV camera lens," Part of the SPIE Conference on Current Developments in Optical Design and Optical Engineering VIII, Denver, Colorado, Jul. 1999, SPIE vol. 3779, pp. 154-164.

* cited by examiner

ULTRA BROAD BAND BEAM STEERING APPARATUS AND METHOD USING CHALCOGENIDE-BASED RISLEY COMBINATION-PRISM PAIR

FIELD OF THE DISCLOSURE

The present disclosure relates generally to beam steering and more particularly to methods and apparatus for beam steering using a chalcogenide-based Risley double-prism pair.

BACKGROUND

Beam steering is employed in optical systems for directing infrared or other beams entering a steering system along an input axis or path in a desired direction, such as toward a target of interest. Common applications for beam steering devices include flight control, astronomical observation and analysis, target material detection, military weapons guidance and counter-measures, etc. In many applications, moreover, beams comprised of multiple components of different wavelengths need to be steered. For example, infrared spectroscopy systems often impart beams on a target surface and measure absorption characteristics of the material across a wide spectrum including many wavelengths to discern the material properties of the target. In such situations, it is desirable that the different wavelengths impinge the same target location as closely as possible to ensure that the spectral analysis is a true measure of the material. In this regard, conventional beam steering systems suffer from dispersion effects causing the different wavelength elements to diverge from one another as the beam travels from the steering apparatus to the target. Accordingly, there is a need for improved beam steering apparatus by which the adverse affects of dispersion can be mitigated.

SUMMARY OF DISCLOSURE

Various details of the present disclosure are hereinafter summarized to facilitate a basic understanding, where this summary is not an extensive overview of the disclosure, and is intended neither to identify certain elements of the disclosure, nor to delineate the scope thereof. Rather, the primary purpose of this summary is to present some concepts of the disclosure in a simplified form prior to the more detailed description that is presented hereinafter. Improved beam steering apparatus is disclosed which includes a Risley double-prism pair with two double-prisms disposed along an optical beam path that can be separately or jointly rotated to direct the beam toward a given target while reducing the relative dispersion of beam components of different wavelengths compared with conventional steering systems. The first double-prism of the pair includes first and second prisms, each having one side that is joined to the other prism along the optical path. The first and second prisms are made of first and second materials, respectively, where the first and second materials have different refractive indices. The second double-prism is spaced from the first double-prism along the optical path and includes a third prism made of a third material and a fourth prism made of a fourth material having different refractive indices relative to each other. One or more of the prisms includes a chalcogenide glass material. The apparatus also includes a first rotatable support structure operative to rotate the first double-prism about the optical path, and a second rotatable support structure operative to rotate the second double-prism about the optical path, along with a controller to control independent or joint rotation of the first and second double-prisms to steer a beam entering the apparatus along the optical path.

In certain embodiments, one or both of the prisms of the second double-prism include a chalcogenide glass material, and the first and second double-prisms may be substantially similar or different. Different chalcogenide glass materials may be used, such as $As_xS_y$ or $As_xSe_y$ in certain embodiments, for example, where the stoichiometric ratio of y/x is about 1.5, and any non-chalcogenide prisms in the apparatus may be made from glass, glass ceramic, crystalline, polycrystalline, or other materials. In one embodiment, the device contains a double-prism pair in which each double-prism consists of different chalcogenide glass prisms. In another embodiment, each double-prism includes a LiF prism and a chalcogenide glass prism. In another embodiment, each double-prism has a $CaF_2$ prism and a chalcogenide glass prism. In yet another embodiment, each double-prism includes a ZnS prism and a chalcogenide glass prism. In still another embodiment, each double-prism has a ZnSe prism and a chalcogenide glass prism.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description of the disclosure when considered in conjunction with the drawings, in which.

DETAILED DESCRIPTION OF THE DISCLOSURE

Figure 1:
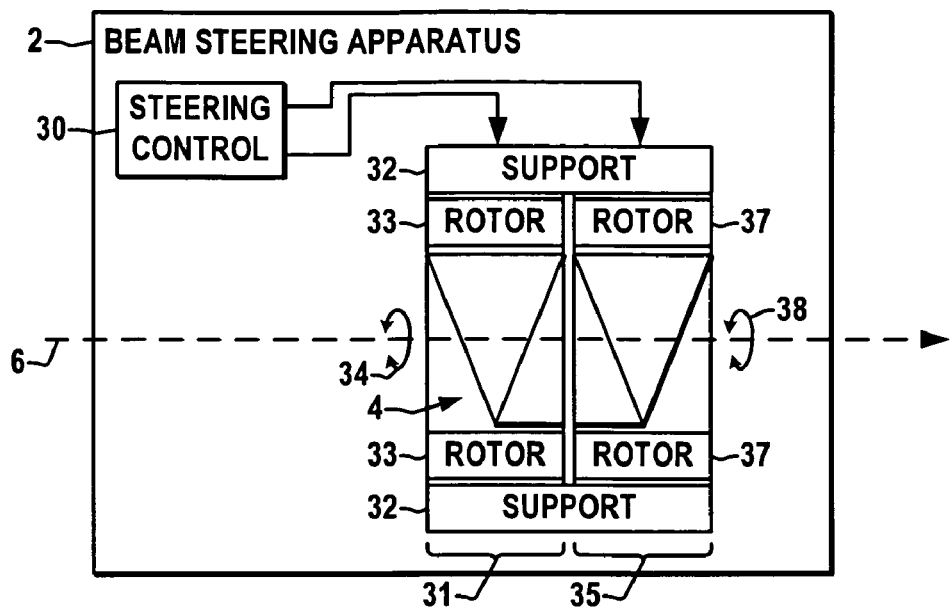
FIG. 1 is a partial side elevation view illustrating an exemplary beam steering system with a chalcogenide-based Risley double-prism pair in accordance with one or more aspects of the disclosure.

Referring to the figures, several embodiments or implementations are hereinafter described in conjunction with the drawings, where like reference numerals are used to refer to like elements throughout, and where the various features are not necessarily drawn to scale.

Figure 2:
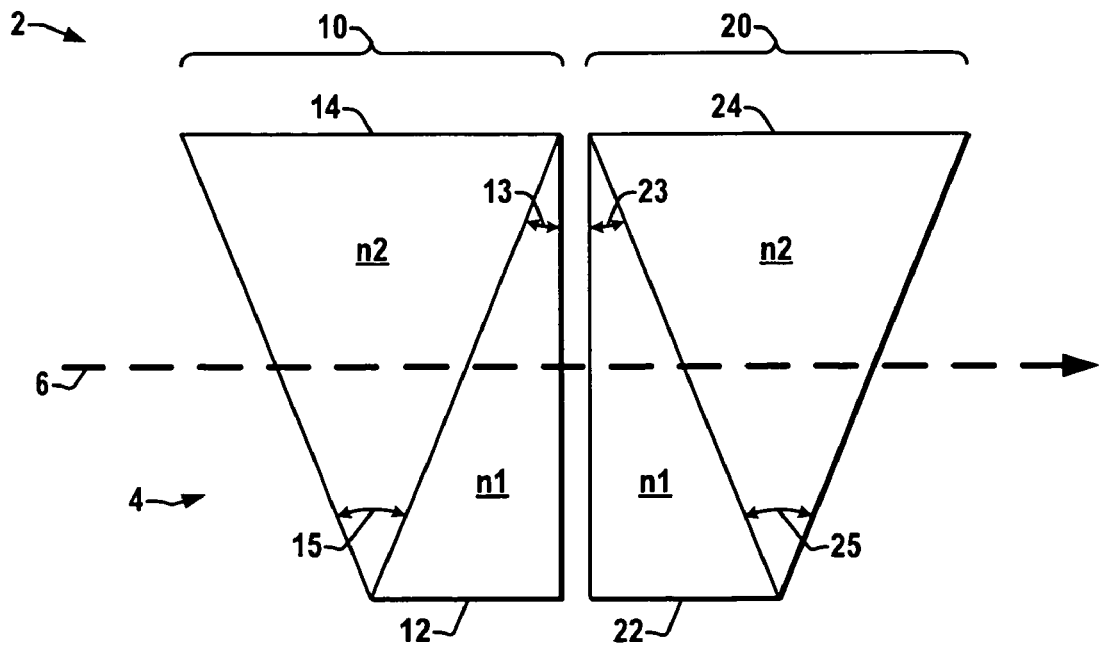
FIG. 2 is a partial side elevation view illustrating further details of an exemplary Risley double-prism pair in the system of FIG. 1.

Referring initially to FIGS. 1 and 2, FIG. 1 illustrates an exemplary beam steering system 2 with a chalcogenide-based Risley double-prism pair 4 for steering a beam received along an optical beam path 6 in accordance with one or more aspects of the disclosure. As further illustrated in FIG. 2, the Risley double-prism pair 4 includes a first double-prism 10 comprised of first and second prisms 12 and 14 with one side of each prism 12, 14 joined along the path 6. The first double prism 10 is rotatably supported by a first rotatable support structure 31, in this case, having a rotor 33 supporting the double prism 10 within a stationary support 32. The support 32 is operable by a steering controller 30 to rotate the first double-prism 10 about the optical path 6 in the direction 34. The Risley double-prism pair 4 further includes a second double-prism 20 spaced from the first double-prism 10 along the optical path 6, which includes a third prism 22 and a fourth prism 24 having sides joined along the path 6. The second double prism 20 is supported in a second rotatable support structure 35 by a rotor 37 within the stationary support 32, which is also operated by the controller 30 to rotate the second double prism 20 about the path 6 in the direction 38. In the illustrated example, a single shared support 32 is provided, although separate supports 32 may be employed. The rotors 33 and 37 may be rotatable within the support 32 by any suitable automatic or manual means, such as motor drives, etc.

Figure 3:
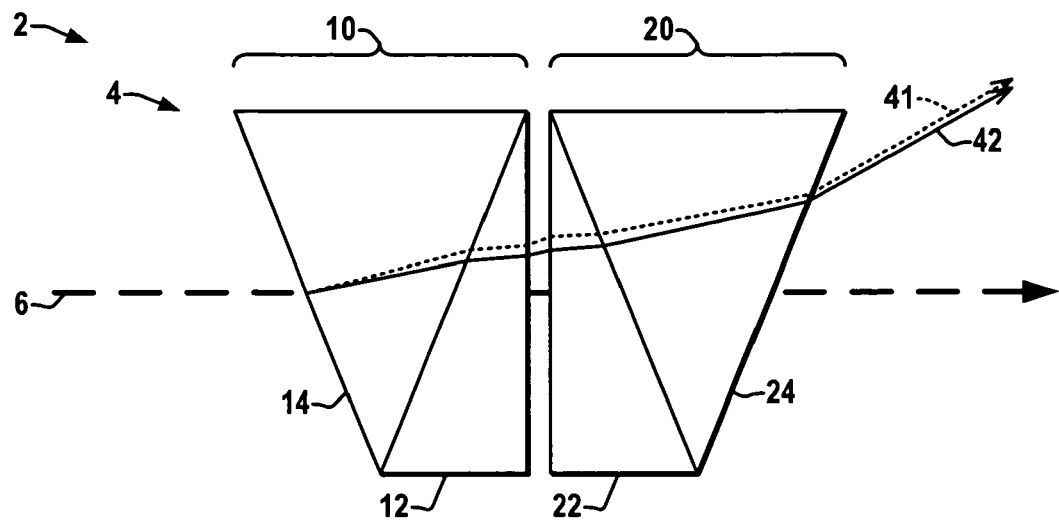
FIG. 3 is a partial side elevation view illustrating operation of the Risley double-prism pair of FIG. 2 with the double-prisms in a first relative position for maximum beam steering in the system of FIG. 1.
Figure 4:
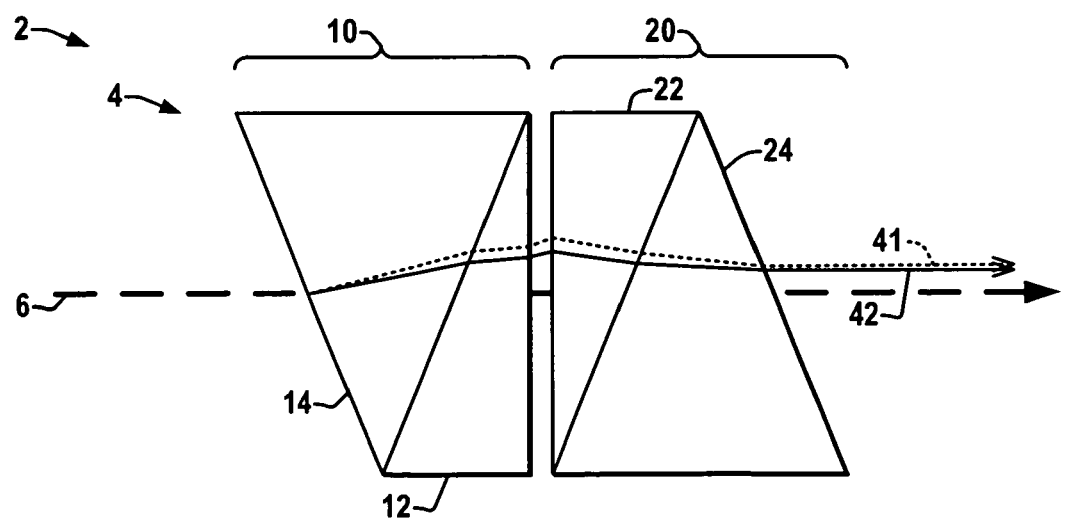
FIG. 4 is a partial side elevation view illustrating operation of the Risley double-prism pair of FIGS. 2 and 3 with the second double-prism rotated 180 degrees for minimum beam steering in the system of FIG. 1.

Referring also to FIGS. 3 and 4, the controller 30 selectively operates the rotatable support structures 31 and/or 35 for independent or joint rotation of the first and second double-prisms 10, 20 to steer a beam entering the apparatus 2 along the optical path 6, where the first rotatable support structure 31 can rotate the first double-prism 10 about the axis of the path 6 in a rotary direction 34 (FIG. 1) and the second rotatable support structure 35 can rotate the second double prism 20 in the direction 38. Counter-rotation of the double-prisms 10 and 20 or single rotation of one of the double-prisms 10 and 20 relative to the other changes the magnitude of beam deviation (steering angle) from the entrance path axis 6, and rotating the double-prisms 10 and 20 together changes deviation in the azimuth. In the embodiment of FIG. 1, the first rotatable support structure 31 and first double-prism 10 are located between the second rotatable support structure 35 and second double-prism 20 and an entrance or input end of the beam steering apparatus 2, although the positions of the first and second double-prisms and rotatable support structures can be switched in other embodiments. FIGS. 2 and 3 illustrate one exemplary positioning of the Risley double-prism pair 4 in which the double-prisms 10 and 20 are located in a first relative position for maximum beam steering. Rotating the second double-prism 20 180 degrees as shown in FIG. 4 provides for steering, where the resultant exit beam components 41, 42 travel generally parallel to the original path direction 6.

Figure 5:
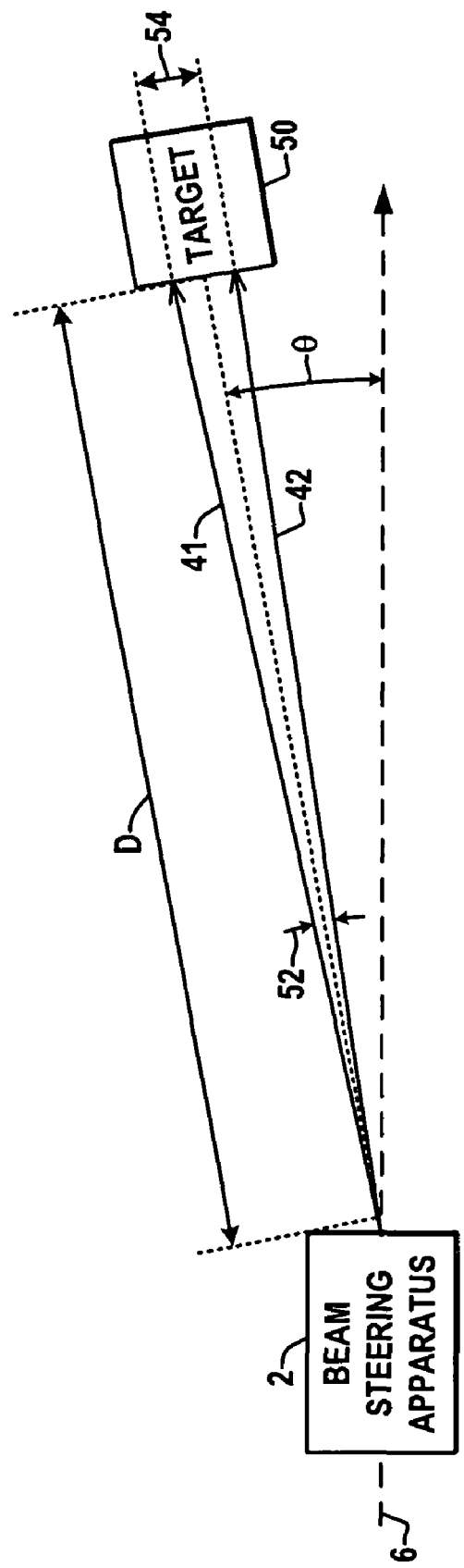
FIG. 5 is a side elevation view illustrating the system of FIG. 1 in use to steer a beam toward a target with minimal dispersion of beam components of different wavelengths.

As shown in FIGS. 3 and 4, where an incoming beam includes components 41 and 42 at different wavelengths (e.g., $\lambda_1$ and $\lambda_2$), the transmission through the double-prism pair 4 leads to a given amount of dispersion, where the beam components 41 and 42 will be slightly divergent at the output of the beam steering apparatus 2. In applications where the beam is directed to a target at a considerable distance away from the apparatus 2, divergence is undesirable as mentioned above. FIG. 5 illustrates the system 2 in use to steer a beam toward a target 50 with dispersion of beam components 41 and 42 shown schematically. In the illustrated case, the target 50 is spaced from the beam steering apparatus 2 by a distance D and is not located along the beam path axis 6, such that the apparatus 2 is adjusted by the controller 30 to rotate one or both of the double-prisms 10, 20 to direct the output beam toward the current target position. The dispersion performance of the apparatus 2 can be quantified with respect to wavelength and/or thermal effects in terms of walk-off distance 54 as spectral walk-off (SWO) for a spectral range from $\lambda_{min}$ to $\lambda_{max}$, where $\lambda_{max} > \lambda_{min}$, and/or thermal walk-off (TWO) for a given double-prism pair design as a function of the distance D. In addition, a given design may be characterized in terms of full-angle spectral or thermal dispersion 52 (FASD or FATD) with respect to either or both of wavelength and/or thermal effects, where the FASD 52 is the difference between the largest steer angle and the smallest steer angle experienced by a beam of any given wavelength within the $[\lambda_{min}, \lambda_{max}]$ interval, and the FATD 52 is the difference between the largest steer angle and the smallest steer angle experienced by a beam of a given wavelength within the thermal interval $[t_{min}, t_{max}]$. As shown in FIGS. 3-5, for a given steer angle, θ, the beam 41 of shorter wavelength, $\lambda_{min}$, will be deflected slightly more than the beam 42 of longer wavelength, $\lambda_{max}$.

The first and second prisms 12 and 14 are respectively made of first and second materials having different refractive indices. The third and fourth prisms 22 and 24 are respectively made of third and fourth materials having different refractive indices. In accordance with certain aspects of the present disclosure, moreover, at least one of the prisms of either or both of the first and second double-prisms 10 and 20 are made of materials that include a chalcogenide glass material. Chalcogenide glass materials as used herein are those glasses that include substantial portions of one or more chalcogenide elements (e.g., sulfur, selenium and/or tellurium), where the compounds of the heavier chalcogens (periodic table group 16 (old-style: group VIB or VIA)), particularly the sulfides, selenides, and tellurides are collectively known as chalcogenides. These chalcogenide components are covalently bonded materials that can be molecular solids where the entire glass matrix is considered to be an infinitely bonded molecule. Chalcogenide glasses contain at least one chalcogen atom selected from S, Se and Te or their mixtures. Furthermore, the addition of other elements such as As, Ge, Ga, Sb, Pb, In, Si facilitates stable glass formation, and may be employed in the chalcogenide glass materials described herein. In some cases, halides such as F, Cl, Br or I or their mixtures can also be added in up to 20 atomic percent within the scope of the disclosure. The chalcogenide glass materials can also be doped with rare earth ions such as Nd, Er, Dy, Tb, Tm, Gd, Sm, Ho, and the like. Examples of glasses include $As_2S_3$, $As_2Se_3$, $Ge_{30}As_{10}Se_{30}Te_{30}$, $Ge_{28}Sb_{12}Se_{60}$ and $Ge_{33}As_{12}Se_{55}$. Some examples of glass systems include Ge—Ga—S, Ge—As—Ga—S, Ga—La—S, Ga—Na—S, Ge—S—I and Ge—As—Se, where the ratios of the elements can vary over considerable ranges.

The disclosed apparatus 2 facilitates beam steering of infrared radiation with minimal dispersion over an ultra-broad wavelength range (e.g., about 1-18 µm) at large steer angles and for ultra-broad wavelength range at very long distances for smaller steer angles. The presently disclosed Risley double-prism pair includes one or more prisms (12, 14, 22, and/or 24) made from a material that include chalcogenide glass, and may be referred to as a chalcogenide-based achromatic Risley double-prism pair. Exemplary chalcogenide glass materials include without limitation $As_xS_y$, $As_xSe_y$ (with x and y approximately x=2 and y=3) where the stoichiometry can deviate from these exemplary values and where all such variant implementations are contemplated as falling within the scope of the present disclosure. The chalcogenide glass prisms may be combined with each other or with other materials such as glasses, glass ceramics, crystalline and polycrystalline materials, for example. Examples of suitable glasses in these combinations include without limitation germanate, silicate, phosphate, borate, and other oxide and halide glasses. Suitable examples of polycrystalline materials for the disclosed combinations include without limitation AlON and Spinel, and examples of suitable crystals for the disclosed combinations include without limitation LiF, $CaF_2$, $BaF_2$, and TlBrI. The material combinations, moreover, may be advantageously tailored according to a given spectral range of interest and by the intended application (e.g., small-angle steering over extra-large distances, wide-angle steering over shorter distances, reduced temperature dependence, etc.).

To further illustrate the operation of the apparatus 2, the example of FIG. 2 provides the first and third prisms 12 and 22 having a first refractive index n1 and the second and fourth prisms 14 and 24 have a second refractive index n2, although this illustrative example is not a strict requirement of the present disclosure. In the embodiment of FIG. 2, moreover, the first and third prisms 12 and 22 are right triangle prisms with substantially equal prism angles 13 and 23, although not a strict requirement of the disclosure. In this example, moreover, the second and fourth prisms 14 and 24 have substantially equal prism angles 15 and 25, although not a requirement of the present disclosure. In addition, the embodiment illustrated in FIG. 2 has substantially similar first and second double-prisms 10 and 20, although not a strict requirement of the present disclosure. For this example, the relationship between the steer angle θ, wavelength λ, and temperature t is given by the following equations:

$$\theta(\lambda, t) = (a1 - a2) + \sin^{-1}\left\{n2 \cdot \sin\left[a2 - \sin^{-1}\left(\frac{n1}{n2} \cdot \sin\left\{a1 - \sin^{-1}\left[\frac{\sin\varphi(\lambda, t)}{n1}\right]\right\}\right)\right]\right\} \quad (1)$$

$$\varphi(\lambda, t) = -\sin^{-1}\left\{n1 \cdot \sin\left[a1 - \sin^{-1}\left(\frac{n2}{n1} \cdot \sin\left\{a2 - \sin^{-1}\left[\frac{\sin(a2 - a1)}{n2}\right]\right\}\right)\right]\right\} \quad (2)$$

where $n1(\lambda,t)$ and $n2(\lambda,t)$ are written simply as n1 and n2. For a given temperature t and for a certain spectral interval [$\lambda_{min}$, $\lambda_{max}$] and distance D, the SWO 54 is the separation between the beam components 41 and 42 steered at the largest and at the smallest angles is therefore given by the following equation (3):

$$SWO(t) = 2 \cdot D \cdot \tan\left(\frac{FASD}{2}\right), \quad (3)$$

where the FASD 52 and the SWO 54 describe the worst-case scenarios of the largest potential dispersion.

Similarly, for a given wavelength and temperature range [$t_{min}$, $t_{max}$], the TWO 54 for a given configuration of the steering device at a distance D away from the steering device is the separation between the beams steered at the largest and at the smallest angles. The TWO is therefore given by the following equation (4):

$$TWO(\lambda) = 2 \cdot D \cdot \tan\left(\frac{FATD}{2}\right). \quad (4)$$

The present disclosure provides various embodiments in which one or more of the four prisms 12, 14, 22, and/or 24 include a chalcogenide glass material. In certain embodiments, such as that depicted in FIG. 2, at least one of the first and second materials includes a chalcogenide glass material and at least one of the third and fourth materials includes a chalcogenide glass material. In certain embodiments, the first chalcogenide glass material is $As_xS_y$ or $As_xSe_y$, where x is about 2 and y is about 3 such that the ratio y/x is about 1.5, where the stoichiometries described herein may vary slightly within the margins normally seen in creation of the described materials. In certain embodiments, moreover, any non-chalcogenide glass materials used in the double-prisms of certain embodiments are selected from the group consisting of a glass, glass ceramic, crystalline, or polycrystalline material, although not a strict requirement of the disclosure. In other embodiments of the system 2, each double-prism 10 and 20 includes different chalcogenide glass materials.

One possible embodiment provides a double-prism pair 4 in which the first, second, third, and fourth materials all include a chalcogenide glass material, where the first and second materials are different from one another, and where the third and fourth materials are different from one another. An example is where one of the first and second materials includes $As_xS_y$ and the other of the first and second materials includes $As_xSe_y$, and where one of the third and fourth materials includes $As_xS_y$ and the other of the third and fourth materials includes $As_xSe_y$, with a ratio y/x of about 1.5.

Another embodiment provides that one of the first and second materials includes LiF and the other of the first and second materials includes a chalcogenide glass material, and where one of the third and fourth materials includes LiF and the other of the third and fourth materials includes a chalcogenide glass material. One example of this embodiment is where the other of the first and second materials includes $As_xS_y$ and where the other of the third and fourth materials includes $As_xS_y$, and where a ratio of y/x is about 1.5. Another example is where the other of the first and second materials includes $As_xSe_y$ and where the other of the third and fourth materials includes $As_xSe_y$, and where a ratio of y/x is about 1.5.

Figure 6:
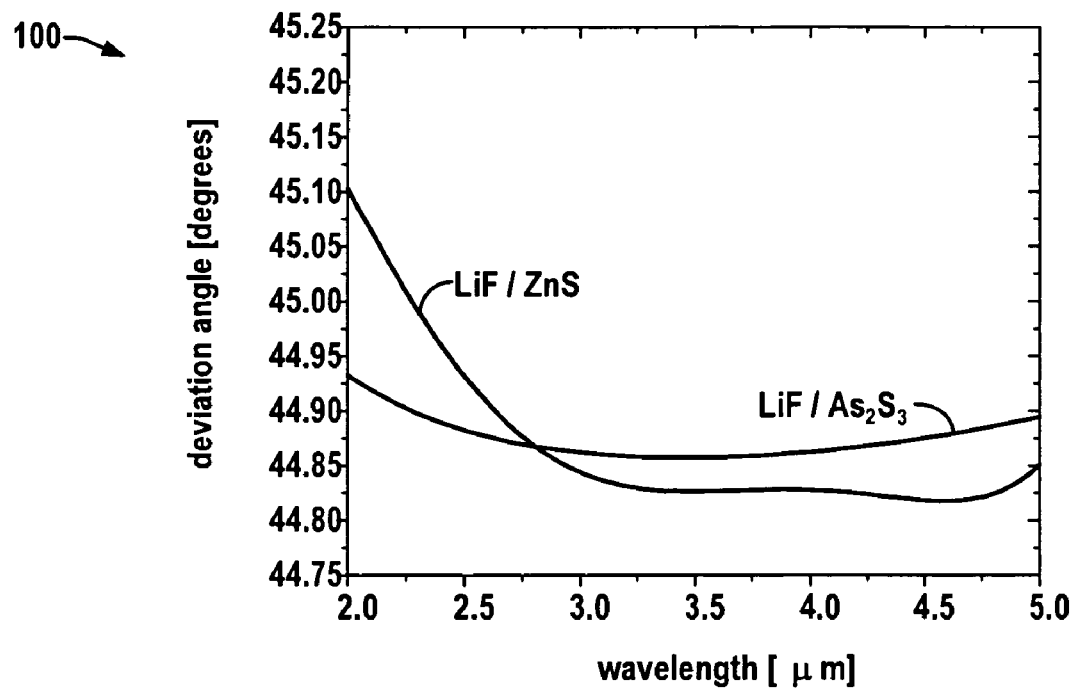
FIG. 6 is a graph illustrating an exemplary comparison between LiF/ZnS and LiF/$As_2S_3$ combinations in a Risley double-prism pair.

Referring to FIG. 6, these embodiments compare favorably to conventional prism pairs formed of LiF or ZnS. An exemplary LiF/$As_2S_3$ combination of the disclosure, even without optimization of refractive index, is superior in the 2-5 µm wavelength region with respect to deviation angle, as shown in the graph 100 of FIG. 6, where the FASD in the LiF/As$_2$S$_3$ case is several times smaller than the FASD for a LiF/ZnS combination for certain wavelengths of interest. For instance, over the range of 2-5 μm, the FASD is 3.8 times smaller in the case of the LiF/As$_2$S$_3$ combination than in the case of LiF/ZnS combination. Also, the SWO at a distance D=1 Km over the range of 2-5 μm is 4.97 m for LiF/ZnS but only 1.30 m for the LiF/As$_2$S$_3$ combination, and thus a significant improvement is seen by this use of As$_2$S$_3$ chalcogenide glass. For specific wavelengths of 2.5 μm and 4.5 μm, moreover, the FASD is 1.977 mrad for the LiF/ZnS combination but only 0.126 mrad for the LiF/As$_2$S$_3$ combination, and the SWO between these two wavelengths at a distance D=1 Km is 1.98 m for LiF/ZnS but only 0.13 m for LiF/As$_2$S$_3$, which is more than 15 times smaller. These exemplary performance comparison results are summarized in Table 1 and illustrated in the graph 100 of FIG. 6.

TABLE 1

| Wavelength Range | Material Combination | FASD [mrad] | SWO @ 1 Km [m] |
|---|---|---|---|
| 2-5 μm | LiF/ZnS | 4.974 | 4.97 |
| | LiF/As$_2$S$_3$ | 1.305 | 1.30 |
| discrete (2.5 μm, 4.5 μm) | LiF/ZnS | 1.977 | 1.98 |
| | LiF/As$_2$S$_3$ | 0.126 | 0.13 |

A further embodiment is where one of the first and second materials includes ZnS and the other of the first and second materials includes a chalcogenide glass material, and where one of the third and fourth materials includes ZnS and the other of the third and fourth materials includes a chalcogenide glass material. One example is where the other of the first and second materials includes As$_x$S$_y$, and where the other of the third and fourth materials includes As$_x$S$_y$, and where a ratio of y/x is about 1.5. Another example is where the other of the first and second materials includes As$_x$Se$_y$, and where the other of the third and fourth materials includes As$_x$Se$_y$, and where a ratio of y/x is about 1.5.

Another possible embodiment is where one of the first and second materials includes ZnSe and the other of the first and second materials includes a chalcogenide glass material, and where one of the third and fourth materials includes ZnSe and the other of the third and fourth materials includes a chalcogenide glass material. One example of this is where the other of the first and second materials includes As$_x$S$_y$, and where the other of the third and fourth materials includes As$_x$S$_y$, and where a ratio of y/x is about 1.5. Another example is where the other of the first and second materials includes As$_x$Se$_y$, and where the other of the third and fourth materials includes As$_x$Se$_y$, and where a ratio of y/x is about 1.5.

Figure 7:
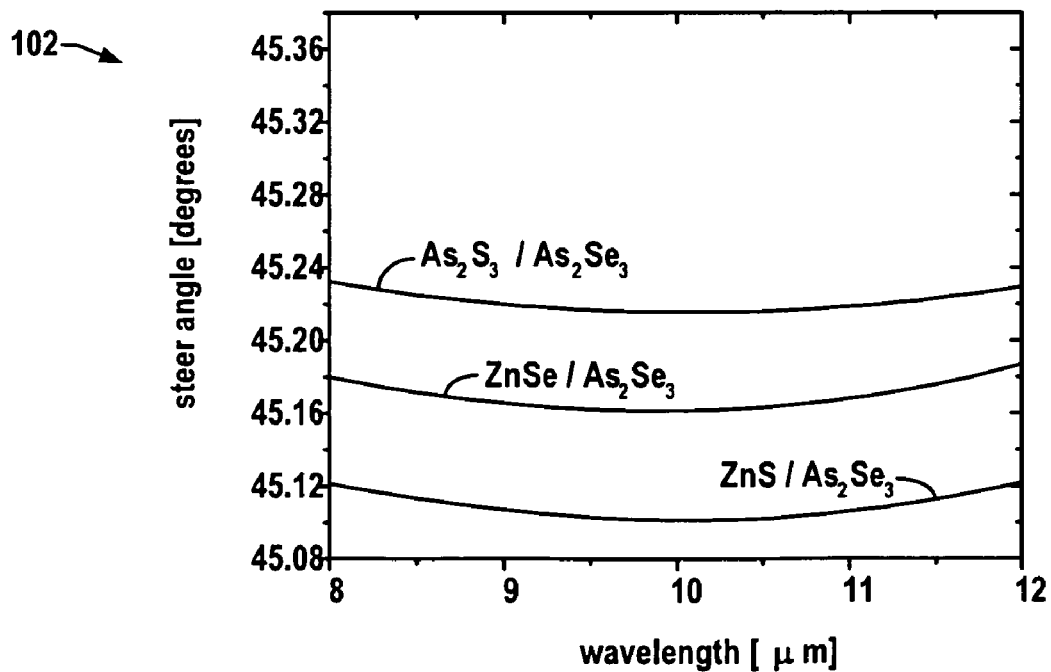
FIG. 7 is a graph illustrating comparison between different chalcogenide-based combinations in the 8-12 μm range.

Referring also to FIG. 7, a graph 102 illustrates comparison between different chalcogenide-based combinations (As$_2$S$_3$/As$_2$Se$_3$; ZnSe/As$_2$Se$_3$; and ZnS/As$_2$Se$_3$) for wavelengths in the ultra-broadband 8-12 μm range for an apparatus 2 designed for zero-dispersion at λ=10.0 μm. In this case the FASD and SWO are summarized in Table 2 below for the combinations.

TABLE 2

| Wavelength Range | Material Combination | FASD [mrad] | SWO @ 1 Km [m] |
|---|---|---|---|
| 8-12 μm | ZnSe/As$_2$S$_3$ | 0.359 | 0.36 |
| | ZnS/As$_2$Se$_3$ | 0.293 | 0.17 |
| | As$_2$S$_3$/As$_2$Se$_3$ | 0.442 | 0.25 |

The As$_2$Se$_3$ combination has the further advantage in that the operating range can be pushed beyond 12 μm, for example, up to 18 μm in the case of the ZnSe/As$_2$Se$_3$ combination, and better performance can be achieved through tailoring of the refractive index of the chalcogenide glasses via composition changes and stoichiometric variations from the compared examples.

Yet another embodiment is where one of the first and second materials includes CaF$_2$ and the other of the first and second materials includes a chalcogenide glass material, and where one of the third and fourth materials includes CaF$_2$ and the other of the third and fourth materials includes a chalcogenide glass material. An example of this embodiment is where the other of the first and second materials includes As$_x$S$_y$, and where the other of the third and fourth materials includes As$_x$S$_y$, and where a ratio of y/x is about 1.5. Another example is where the other of the first and second materials includes As$_x$Se$_y$, and where the other of the third and fourth materials includes As$_x$Se$_y$, and where a ratio of y/x is about 1.5.

Figure 8:
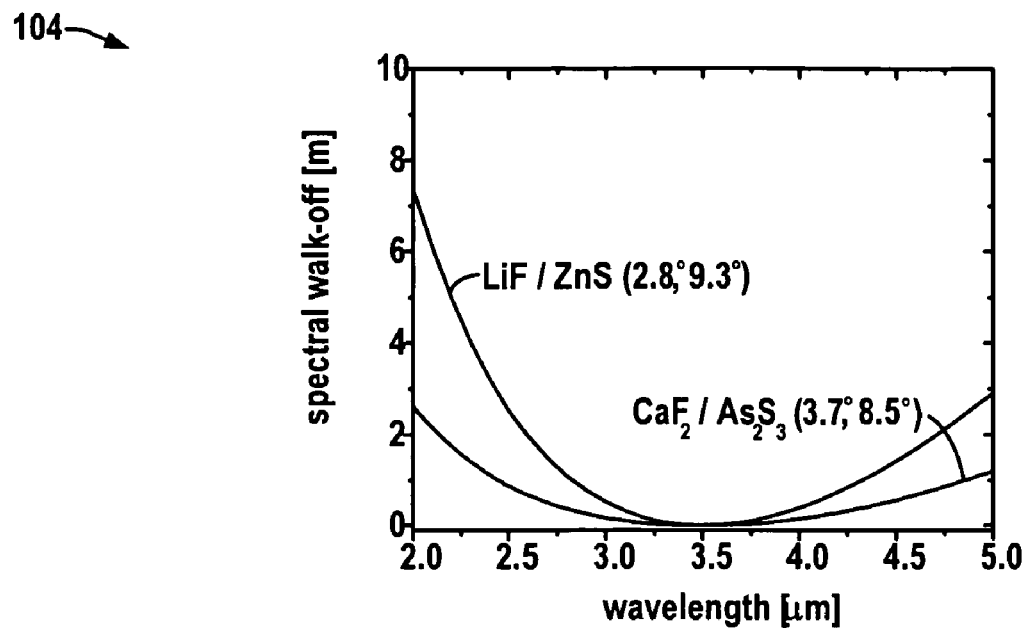
FIG. 8 is a graph illustrating spectral performance comparison between LiF/ZnS and $CaF_2$/$As_2S_3$ combinations in terms of spectral walk-off distance (SWO) for a steer angle of 22° at a distance of 5 km.
Figure 9:
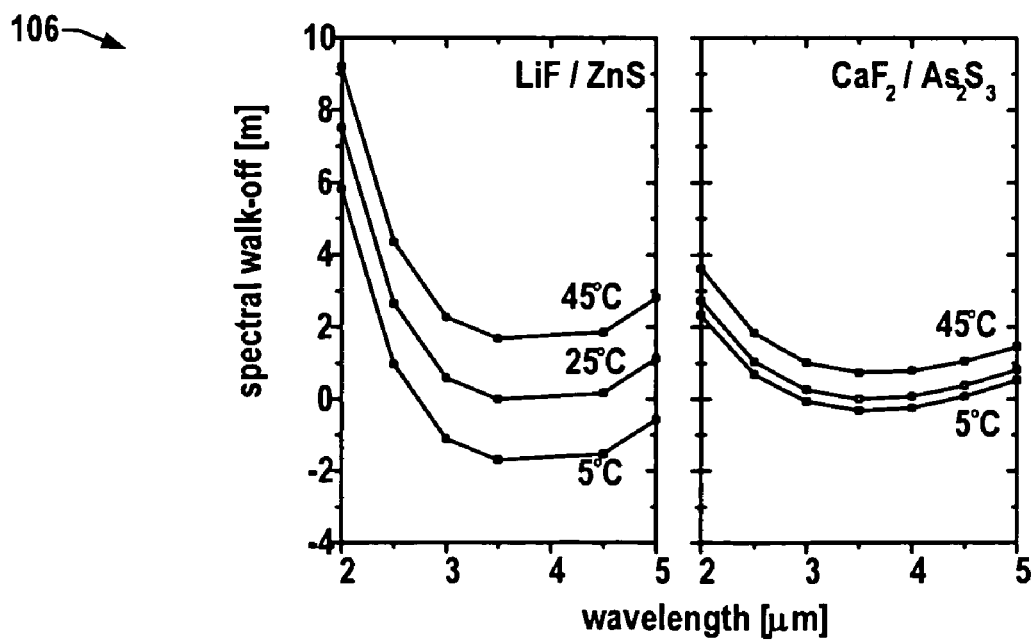
FIG. 9 is a graph illustrating thermal performance comparison between LiF/ZnS and $CaF_2$/$As_2S_3$ combinations in terms of spectral walk-off distance (SWO) for a steer angle of 22° at a distance of 5 km.

Graphs 104 and 106 in FIGS. 8 and 9 illustrate spectral and thermal performance comparison between LiF/ZnS and CaF$_2$/As$_2$S$_3$ combinations in terms of spectral walk-off distance (SWO) for a steer angle of 22° at a distance D of 5 km at different temperatures 5, 25, and 45 degrees C. for a beam steering apparatus 2 designed to yield zero-dispersion at 3.5 μm. As shown in the SWO curves of graph 104 (FIG. 8), the use of chalcogenide glass in the exemplary CaF$_2$/As$_2$S$_3$ combination provides superior performance in the 2-5 μm wavelength range, and the SWO curves in the graph 106 in FIG. 9 illustrate significantly lower temperature variation for the chalcogenide glass-based combination CaF$_2$/As$_2$S$_3$ compared with a conventional LiF/ZnS prism combination. In this regard, the thermal dispersion in the CaF$_2$/As$_2$S$_3$ case is more than three times smaller than in the case of the LiF/ZnS combination, which was conventionally viewed as the best conventional design. The comparative results are listed in the following Table 3.

TABLE 3

| | SWO* [m] | | | normalized TWO** [m · degree$^{-1}$] | |
|---|---|---|---|---|---|
| Wavelength Range | LiF/ZnS | CaF$_2$/As$_2$S$_3$ | Wavelength | LiF/ZnS | CaF$_2$/As$_2$S$_3$ |
| 2-5 μm | 7.356 | 2.632 | 2 μm | 0.085 | 0.032 |
| | | | 3 μm | 0.085 | 0.027 |
| | | | 4 μm | 0.084 | 0.026 |
| | | | 5 μm | 0.085 | 0.023 |

Figure 10:
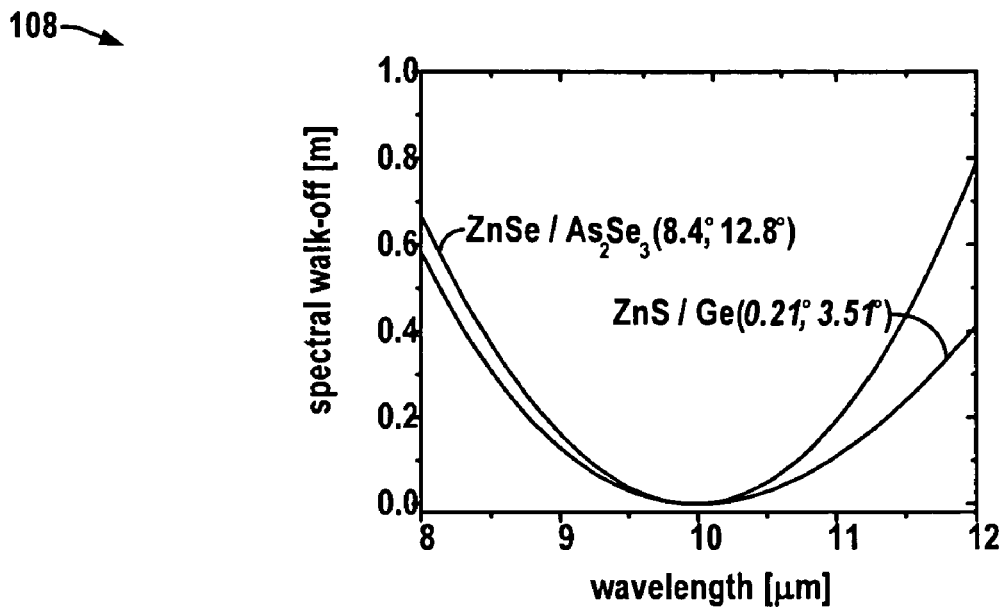
FIG. 10 is a graph illustrating spectral performance comparison between ZnS/Ge and ZnSe/As$_2$Se$_3$ combinations in terms of spectral walk-off distance (SWO) for a steer angle of 22° at a distance of 5 km.
Figure 11:
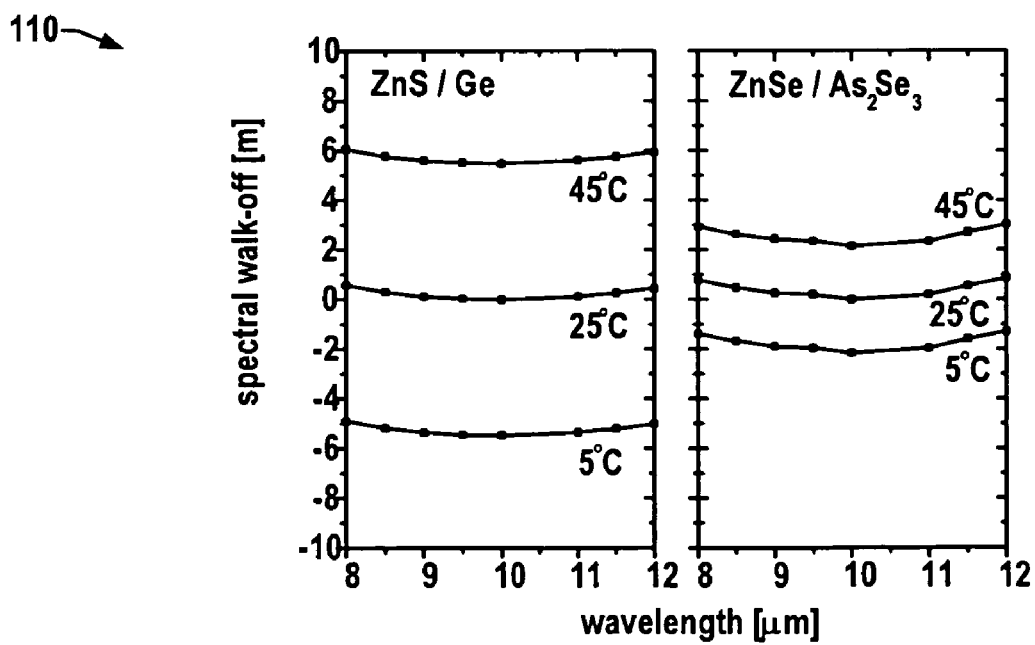
FIG. 11 is a graph illustrating thermal performance comparison between ZnS/Ge and ZnSe/As$_2$Se$_3$ combinations in terms of spectral walk-off distance (SWO) for a steer angle of 22° at a distance of 5 km.

Referring to the graphs 108 and 110 of FIGS. 10 and 11, spectral and thermal performance comparisons are illustrated between conventional ZnS/Ge and an exemplary chalcogenide-based ZnSe/As$_2$Se$_3$ combination with respect to SWO for a 22° steer angle at a distance D of 5 km over an ultra-broadband spectral range from 8 μm to 12 μm, as further detailed in Table 4 below. The system 2 in this example was designed for zero-dispersion at 10.0 μm by employing ZnSe/As$_2$Se$_3$ prism combinations. As seen in the graphs 108 and 110 and in Table 4, the SWO and TWO performance of the chalcogenide-based design is superior to that of the conventional ZnS/Ge combination (TWO determined over a temperature range of 5-45° C.), which was previously considered the best in this spectral range. The chalcogenide-based system of the present disclosure has a thermal dispersion twice as small as that of the ZnS/Ge system, and the thermal dispersion of the ZnS/Ge system becomes larger than the spectral dispersion for temperature variations of only 2.5° C. in the 8-12 μm wavelength range.

TABLE 4

| Wavelength Range | SWO* [m] | | Wavelength | normalized TWO** [m · degree$^{-1}$] | |
|---|---|---|---|---|---|
| | ZnS/Ge | ZnSe/ As$_2$Se$_3$ | | ZnS/Ge | ZnSe/As$_2$Se$_3$ |
| 8-12 μm | 0.583 | 0.791 | 8 μm | 0.274 | 0.108 |
| | | | 10 μm | 0.274 | 0.108 |
| | | | 12 μm | 0.274 | 0.108 |

The chalcogenide-based beam steering apparatus 2 of the present disclosure is thus a significant advance over the conventional systems, particularly for ultra-broadband spectral range infrared beam steering, and may be successfully employed to mitigate angular and thermal dispersion over the ultra-broadband continuous spectral range of 1 μm to 12 μm and beyond to a degree not previously achievable using conventional designs. The disclosed apparatus, moreover, allows replacement of expensive and difficult to produce and handle materials such as TlBrI, CsBr, Ge or AgCl, with basic chalcogenide glasses which are cheaper, more stable and less sensitive to external factors, while yielding better or comparable performance. The chalcogenide-based combinations using the As$_2$Se$_3$ glass, moreover, can be implemented with lesser prism angle requirements than the conventional ZnS/Ge combination, thereby reducing processing and manufacturing costs. Also, the chalcogenide-based combinations allow tailoring the glass composition, for example, to adjust the refraction index profile as a function of wavelength, to further improve the performance of the beam steering system 2.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A beam steering apparatus comprising:
    a Risley double-prism pair, including:
        a first double-prism comprising a first prism made of a first material and a second prism made of a second material, the first and second materials having different refractive indices, each of the first and second prisms having one side joined to the other prism of the double-prism along an optical path, where one of the first and second materials includes As$_x$S$_y$ or As$_x$Se$_y$;
        a second double-prism spaced from the first double-prism along the optical path and comprising a third prism made of a third material and a fourth prism made of a fourth material, the third and fourth materials having different refractive indices, each of the third and fourth prisms having one side joined to the other prism of the second double-prism along the optical path;
    a first rotatable support structure operative to rotate the first double-prism about the optical path;
    a second rotatable support structure operative to rotate the second double-prism about the optical path; and
    a controller operatively coupled with the first and second rotatable support structures to control independent or joint rotation of the first and second double-prisms to steer a beam entering the apparatus along the optical path.

2. The beam steering apparatus of claim 1, where at least one of the third and fourth materials includes a chalcogenide glass material.

3. The beam steering apparatus of claim 1, where the first and second double-prisms are substantially similar.

4. The beam steering apparatus of claim 1, where a ratio of y/x is about 1.5.

5. The beam steering apparatus of claim 1, where the other of the first and second materials is a glass, glass ceramic, crystalline, or polycrystalline material.

6. The beam steering apparatus of claim 1, where the first, second, third, and fourth materials include a chalcogenide glass material, where the first and second materials are different from one another, and where the third and fourth materials are different from one another.

7. The beam steering apparatus of claim 6, where one of the first and second materials includes As$_x$S$_y$ and the other of the first and second materials includes As$_x$Se$_y$, and where one of the third and fourth materials includes As$_x$S$_y$ and the other of the third and fourth materials includes As$_x$Se$_y$, and where a ratio of y/x is about 1.5.

8. The beam steering apparatus of claim 1, where one of the first and second materials includes LiF, and where one of the third and fourth materials includes LiF and the other of the third and fourth materials includes a chalcogenide glass material.

9. The beam steering apparatus of claim 8, where the other of the third and fourth materials includes As$_x$S$_y$, and where a ratio of y/x is about 1.5.

10. The beam steering apparatus of claim 8, where the other of the third and fourth materials includes As$_x$Se$_y$, and where a ratio of y/x is about 1.5.

11. The beam steering apparatus of claim 1, where one of the first and second materials includes CaF$_2$, and where one of the third and fourth materials includes CaF$_2$ and the other of the third and fourth materials includes a chalcogenide glass material.

12. The beam steering apparatus of claim 11, where the other of the third and fourth materials includes As$_x$S$_y$, and where a ratio of y/x is about 1.5.

13. The beam steering apparatus of claim 11, where the other of the third and fourth materials includes As$_x$Se$_y$, and where a ratio of y/x is about 1.5.

14. The beam steering apparatus of claim 1, where one of the first and second materials includes ZnS, and where one of the third and fourth materials includes ZnS and the other of the third and fourth materials includes a chalcogenide glass material.

15. The beam steering apparatus of claim 14, where the other of the third and fourth materials includes $As_xS_y$, and where a ratio of y/x is about 1.5.

16. The beam steering apparatus of claim 14, where the other of the third and fourth materials includes $As_xSe_y$, and where a ratio of y/x is about 1.5.

17. The beam steering apparatus of claim 1, where one of the first and second materials includes ZnSe, and where one of the third and fourth materials includes ZnSe and the other of the third and fourth materials includes a chalcogenide glass material.

18. The beam steering apparatus of claim 17, where the other of the third and fourth materials includes $As_xS_y$, and where a ratio of y/x is about 1.5.

19. The beam steering apparatus of claim 17, where the other of the third and fourth materials includes $As_xSe_y$, and where a ratio of y/x is about 1.5.

20. A method for infrared beam steering comprising:
    steering a beam using a Risley double-prism pair, including:
        a first double-prism comprising a first prism made of a first material and a second prism made of a second material, the first and second materials having different refractive indices, each of the first and second prisms having one side joined to the other prism of the double-prism along an optical path;
        a second double-prism spaced from the first double-prism along the optical path and comprising a third prism made of a third material and a fourth prism made of a fourth material, the third and fourth materials having different refractive indices, each of the third and fourth prisms having one side joined to the other prism of the second double-prism along the optical path, where at least one of the first, second, third, and fourth materials includes a chalcogenide glass material;
    using a controller operatively coupled with first and second rotatable support structures to control independent or joint rotation of the first and second double-prisms to steer a beam along the optical path, wherein the first rotatable support structure is operative to rotate the first double-prism about the optical path and the second rotatable support structure is operative to rotate the second double-prism about the optical path; and
    wherein infrared radiation over a wavelength range of 2 to 18 microns may be steered.

* * * * *